United States Patent
Yamanaka et al.

(10) Patent No.: US 9,343,759 B2
(45) Date of Patent: May 17, 2016

(54) FUEL CELL SYSTEM AND STARTING METHOD THEREOF

(75) Inventors: Tomio Yamanaka, Okazaki (JP); Yoshiaki Naganuma, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 51 days.

(21) Appl. No.: 14/345,778

(22) PCT Filed: Oct. 14, 2011

(86) PCT No.: PCT/JP2011/005764
§ 371 (c)(1),
(2), (4) Date: Mar. 19, 2014

(87) PCT Pub. No.: WO2013/054383
PCT Pub. Date: Apr. 18, 2013

(65) Prior Publication Data
US 2014/0205926 A1    Jul. 24, 2014

(51) Int. Cl.
*H01M 8/04* (2006.01)

(52) U.S. Cl.
CPC ...... *H01M 8/04201* (2013.01); *H01M 8/04089* (2013.01); *H01M 8/04223* (2013.01); *H01M 8/04753* (2013.01); *Y02E 60/50* (2013.01)

(58) Field of Classification Search
None
See application file for complete search history.

(56) References Cited

U.S. PATENT DOCUMENTS

| 2005/0112424 A1 | 5/2005 | Hirano et al. |
| 2010/0104909 A1 | 4/2010 | Takeshita et al. |

FOREIGN PATENT DOCUMENTS

| CN | 101657925 A | 2/2010 |
| DE | 201004055728 A1 | 7/2005 |
| JP | 2000-249249 A | 9/2000 |
| JP | 2003-207071 A | 7/2003 |
| JP | 2005-158282 A | 6/2005 |
| JP | 2007-134154 A | 5/2007 |
| JP | 2007-179949 A | 7/2007 |
| JP | 2008-243762 A | 10/2008 |
| JP | 2008-251315 A | 10/2008 |
| JP | 2008269857 A | 11/2008 |
| JP | 2010277801 A | 12/2010 |

*Primary Examiner* — Jonathan Crepeau
(74) *Attorney, Agent, or Firm* — Kenyon & Kenyon LLP

(57) ABSTRACT

The problem is that a large force is required to open a flow-dividing shut valve provided in an air supply path for supplying the air to a fuel cell stack at a start of a fuel cell system. This problem is solved by reducing a pressure difference between upstream and downstream of the flow-dividing shut valve, before the flow-dividing shut valve is opened, at a start of the fuel cell system.

20 Claims, 3 Drawing Sheets

CHANGE IN SUPPLY FLOW RATE

FUEL CELL SYSTEM AND STARTING METHOD THEREOF

CROSS-REFERENCE TO RELATED APPLICATION

This is a national phase application based on the PCT International Patent Application No. PCT/JP2011/005764 filed on Oct. 14, 2011, the entire contents of which are incorporated herein by reference.

TECHNICAL FIELD

The present invention relates to starting a fuel cell.

BACKGROUND ART

In a fuel cell stack, the air and a fuel gas are supplied to a fuel cell stack for power generation. A valve may be provided in an air supply path. This valve is closed during stop of power generation of the fuel cell system and may be opened simultaneously with a start of operation of the fuel cell system (for example, PTL 1 and 2).

CITATION LIST

Patent Literature

[PTL 1] JP 2007-134154A
[PTL 2] JP 2005-158282A

SUMMARY OF INVENTION

Technical Problem

Closing the valve during stop of power generation as described above cuts off the air in the fuel cell stack from the atmosphere. Such cutoff may generate a pressure difference between the atmosphere and the air in the fuel cell stack. Generation of such a pressure difference may be attributed to, for example, that the reaction of oxygen with the fuel gas proceeds even after stop of operation and reduces the oxygen partial pressure. In this case, the inner pressure of the fuel cell stack becomes smaller than the atmospheric pressure, i.e., negative pressure. This pressure difference increases the force required for opening the valve. There is accordingly a problem that a mechanism of producing a large force is required to open and close the valve. Additionally, there is another problem that this mechanism increases the manufacturing cost of the fuel cell system.

Solution to Problem

In order to solve the problems described above, the invention is implemented by the following aspects.

(1) According to one aspect of the invention, there is provided a fuel cell system that comprises a fuel cell stack, an air supplier discharger, a valve controller and a pressure regulator. The air supplier discharger supplies the air to the fuel cell stack through an air supply path and discharges the air from the fuel cell stack through an air discharge path during operation of the fuel cell stack. The valve controller opens a supply shut valve provided in the air supply path at a start of the fuel cell system. The pressure regulator reduces a pressure difference between upstream and downstream of the supply shut valve, before the valve controller opens the supply shut valve.

In this fuel cell system, the supply shut valve is opened in the state of a small pressure difference between upstream and downstream of the supply shut valve at a start of the fuel cell system. This accordingly prevents a large force from being required for opening the supply shut valve by the valve controller. This results in reducing the manufacturing cost of the fuel cell system.

The fuel cell (1) may employ any configuration combined with at least one of the following aspects (2) to (14), may be combined with any configuration other than those described in (2) to (14), or may be implemented without being combined with any configuration.

(2) The air supplier discharger compresses the air taken in from the atmosphere and supplies the compressed air to the fuel cell stack during operation of the fuel cell system. The pressure regulator makes an air pressure in the fuel cell stack approach to the atmospheric pressure, in order to reduce the pressure difference between upstream and downstream of the supply shut valve.

This fuel cell system simplifies the configuration of the pressure regulator that is operated with the atmospheric pressure as the target value.

(3) The pressure regulator has a pressure-regulating shut valve.

The pressure-regulating shut valve is a valve provided in the air discharge path to regulate the air pressure in the fuel cell stack during operation of the fuel cell system. The pressure regulator opens the pressure-regulating shut valve to regulate the air pressure in the fuel cell stack at a start of the fuel cell system.

This fuel cell system enables the air to be moved between the atmosphere and the air in the fuel cell stack, thus facilitating pressure regulation. This eliminates, for example, the need for storing a gas for pressure regulation. This also eliminates the need for providing a special valve for regulating the pressure at the start time, thus simplifying the configuration of the fuel cell system and reducing the manufacturing cost.

(4) The pressure-regulating shut valve has a mechanism of reducing a pressure difference between upstream and downstream of the pressure-regulating shut valve in a closed state of the pressure-regulating shut valve.

This fuel cell system prevents a large force from being required to open the pressure-regulating shut valve.

(5) The fuel cell system further comprises a bypass. The bypass serves as a flow path causing the air to flow from the air supply path to the air discharge path without passing through the fuel cell stack in at least a closed state of the supply shut valve.

This fuel cell system utilizes the bypass to enable the air taking in from the atmosphere through the air supply path to be supplied to the air discharge path without passing through the fuel cell stack. The air taking in through the air supply path is supplied to the fuel cell stack during operation and is more suitable for the supply to the fuel cell stack than the air taken in through the air discharge path.

It does not matter whether or not the bypass serves as the flow path causing the air to flow from the air supply path to the air discharge path in the open state of the supply shut valve.

(6) The pressure-regulating shut valve is provided between the fuel cell stack and a connection point of the air discharge path and the bypass. The pressure regulator opens the pressure-regulating shut valve after the air supplier discharger starts compression of the air.

This fuel cell system reduces foreign substances (for example, ice, dust and gravel) flowing into the fuel cell stack. The air supplier discharger starts compression of the air in the closed state of the pressure-regulating shut valve, so that the compressed air does not flow into the fuel cell stack but flows through the bypass and the air discharge path to be released to the atmosphere. In this process, at least part of the foreign substances remaining in the fuel cell system is discharged to the atmosphere. After that, the pressure-regulating shut valve is opened to flow the compressed air into the fuel cell stack. This accordingly reduces the foreign substances flowing into the fuel cell stack.

The location "between the fuel cell stack and a connection point of the air discharge path and the bypass" means any location between the fuel cell stack and this connection point. Herein "after the air supplier discharger starts compression of the air" includes simultaneously with the start of compression and after the start of compression.

(7) The valve controller opens the supply shut valve after the air pressure in the fuel cell stack reaches the atmospheric pressure.

This fuel cell system prevents the atmosphere from flowing in from an open air port of the air discharge path. This makes foreign substances unlikely to be flowed from the atmosphere into the air discharge path and thereby unlikely to be flowed into the fuel cell stack. Additionally, the supply shut valve is opened in the state that there is no substantial pressure difference between upstream and downstream of the supply shut valve. This enables the supply shut valve to be opened with a small force. Herein "after the air pressure in the fuel cell stack reaches the atmospheric pressure" includes simultaneously with the air pressure reaching the atmospheric pressure and after the air pressure reaching the atmospheric pressure.

(8) The supply shut valve is a flow-dividing valve provided at a connection point of the air supply path and the bypass.

This fuel cell system has the simple configuration. The state that the supply shut valve is opened means the state that enables the air to flow at least between an open air port of the air supply path and the fuel cell stack. It, however, does not matter whether or not this state enables the air to flow between the air supply path and the bypass.

(9) The air supplier discharger supplies the air at such a flow velocity that prevents the air flowing in through an open air port of the air discharge path from flowing into the fuel cell stack after the pressure-regulating shut valve is opened.

This fuel cell system makes foreign substances unlikely to flowed from the atmosphere into the air discharge path and thereby unlikely to be flowed into the fuel cell stack.

(10) The air supplier discharger maintains a supply flow rate that is a flow rate of the supplied air at a target value after the supply shut valve is opened. The air supplier sets the supply flow rate to a smaller value than the target value before the supply shut valve is opened.

This fuel cell system reduces noise and/or vibration (hereinafter "noise and/or vibration" is referred to as "noise and others") produced by an abrupt increase in supply flow rate or an abrupt increase in air pressure in the fuel cell stack. Herein "smaller value" includes a constant value and a varying value.

(11) The air supplier discharger maintains the supply flow rate at a constant value smaller than the target value after the pressure-regulating shut valve is opened but before the supply shut valve is opened.

(12) The air supplier discharger linearly increases the supply flow rate, in order to make the supply flow rate reach the target value.

This fuel cell system gradually increases the supply flow rate by linear increase. This reduces the noise and others.

(13) The air supplier discharger increases the supply flow rate with increasing a change rate of the supply flow rate, in order to make the supply flow rate reach the target value.

This fuel cell system makes the supply flow rate approach to the target value with increasing the change rate of the supply flow rate. The flow rate thus gradually increases at a low change rate immediately after a start of supply. This reduces the noise and others especially immediately after a start of supply.

(14) The air supplier discharger increases the supply flow rate with at first increasing a change rate of the supply flow rate and subsequently decreasing the change rate of the supply flow rate, in order to make the supply flow rate reach the target value.

In this fuel cell system, the flow rate gradually increases at a low change rate immediately after a start of supply and immediately before the flow rate reaches the target value. This reduces the noise and others especially immediately after the start of supply and immediately before the flow rate reaches the target value.

A start method of a fuel cell system described below has the similar advantageous effects to those of the fuel cell system (1).

(15) The start method reduces a pressure difference between upstream and downstream of a supply shut valve which is provided in a flow path for supplying the air to a fuel cell stack, before the supply shut valve is opened, at a start of the fuel cell system.

DESCRIPTION OF EMBODIMENTS

1. Hardware Configuration (FIG. 1)

Figure 1:
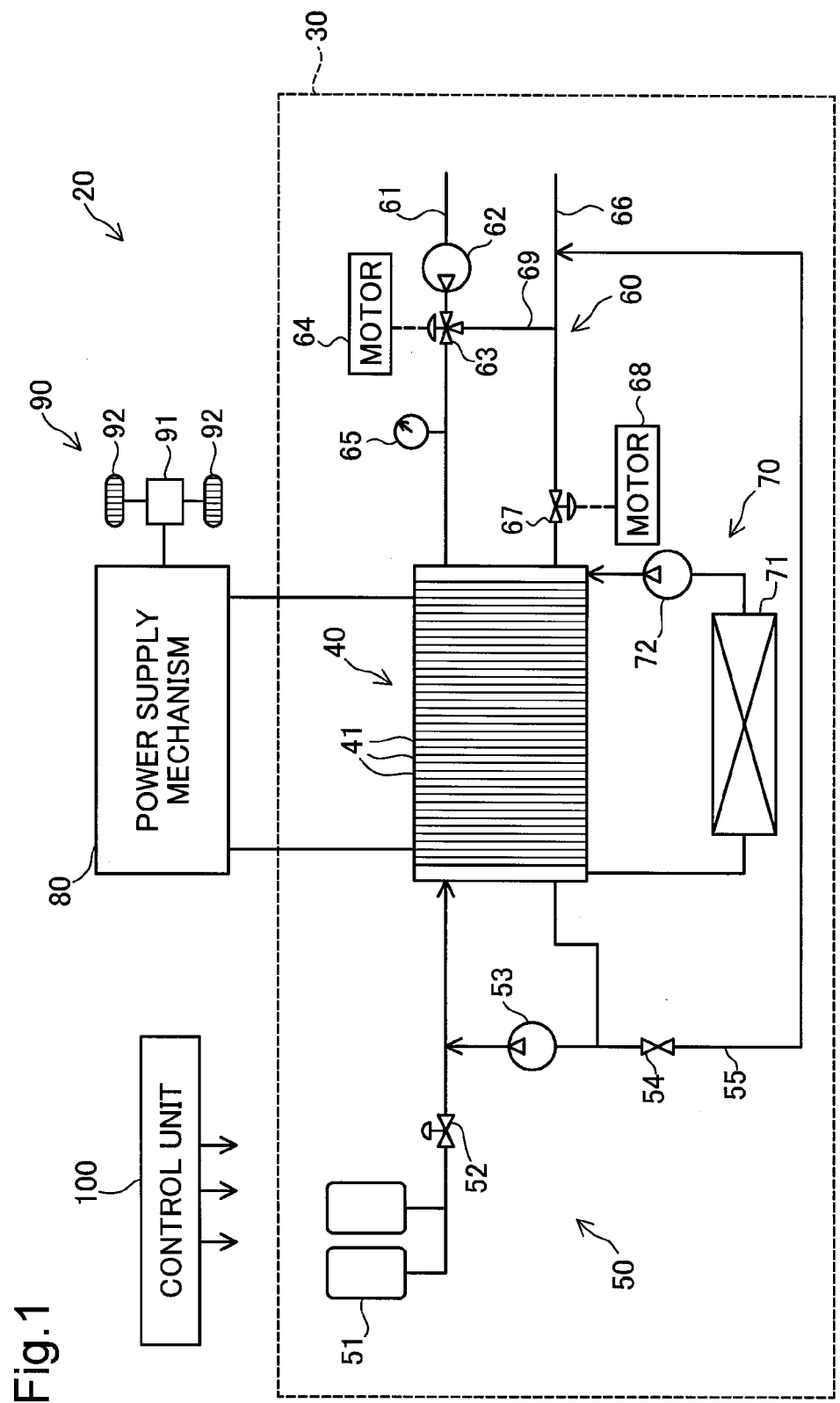
FIG. 1 is a block diagram illustrating the schematic configuration of a fuel cell vehicle 20.

FIG. 1 is a block diagram illustrating the schematic configuration of a fuel cell vehicle 20. The fuel cell vehicle 20 is a four-wheeled vehicle and includes a fuel cell system 30, a power supply mechanism 80 and a drive mechanism 90.

The fuel cell system 30 employs a solid electrolyte fuel cell and generates electric power through reaction of hydrogen with oxygen. As shown in FIG. 1, the fuel cell system 30 includes a fuel cell stack 40, a hydrogen supply discharge mechanism 50, an air supply discharge mechanism 60, a cooling water circulation mechanism 70 and a control unit 100.

The fuel cell stack 40 is formed by stacking a plurality of unit cells 41. The unit cell 41 is comprised of an anode, a cathode, an electrolyte and a separator.

The hydrogen supply discharge mechanism 50 provided to supply and discharge hydrogen to and from the fuel cell stack 40 includes a hydrogen tank 51, a regulator 52, a hydrogen circulation pump 53, a purge valve 54 and a discharge path 55. The hydrogen tank 51 stores hydrogen. The regulator 52 regulates the pressure and the supply amount of hydrogen stored in the hydrogen tank 51 and supplies the hydrogen of the regulated pressure and supply amount to the anodes of the respective unit cells 41. The hydrogen circulation pump 53 recirculates hydrogen unconsumed and discharged from the anodes to the unit cells 41.

The purge valve 54 is provided as a valve located at a connection point between a hydrogen circulation path of the hydrogen supply discharge mechanism 50 and the discharge path 55. The discharge path 55 is provided as a path connecting the hydrogen circulation path of the hydrogen supply discharge mechanism 50 with an air discharge path 66 (described later) included in the air supply discharge mechanism 60. When impurities increase in the hydrogen circulation path, the purge valve 54 is opened to remove the impurities through the air discharge path.

The air supply discharge mechanism 60 provided to supply and discharge the air to and from the fuel cell stack 40 includes an air supply path 61, an air discharge path 66 and a bypass 69. The air supply path 61 and the air discharge path 66 are flow paths connecting the fuel cell stack 40 with their open air ports. An air cleaner is provided at the open air port of the air supply path 61. The bypass 69 is a flow path connecting the air supply path 61 with the air discharge path 66.

The air supply discharge mechanism 60 includes an air compressor 62. The air compressor 62 is provided in the middle of the air supply path 61 to take in the air through the open air port of the air supply path 61 and compress the intake air. The location where the air compressor 62 is provided is closer to the open air port than a connection point between the air supply path 61 and the bypass 69.

The air supply discharge mechanism 60 has a flow-dividing shut valve 63. The flow-dividing shut valve 63 is provided at the connection point between the air supply path 61 and the bypass 69 to divide the flow of the compressed air from the air compressor 62 into the downstream side of the air supply path 61 and the bypass 69. This valve is also called three-way valve. Herein "flow-dividing" includes distribution of the flow into two parts and 100% distribution of the flow to only one part.

The air supply discharge mechanism 60 includes a flow-dividing shut valve motor 64. The flow-dividing shut valve motor 64 generates a torque for regulating the distribution of the flows divided by the flow-dividing shut valve 63.

The air supply discharge mechanism 60 includes a pressure gauge 65. The pressure gauge 65 measures the air pressure in the air supply path 61 downstream of the flow-dividing shut valve 63. According to this embodiment, the measurement result by the pressure gauge 65 is used as the air pressure in the fuel cell stack 40 (hereinafter referred to as "stack inner pressure"). The stack inner pressure is used for control described later.

The air supply discharge mechanism 60 includes a pressure-regulating shut valve 67. The pressure-regulating shut valve 67 is provided in the air discharge path 66 to regulate the flow cross sectional area of the air discharge path 66 according to the valve opening. The pressure-regulating shut valve 67 includes a pilot valve to cancel the pressure difference between its upstream and downstream at the valve opening of zero.

The air supply discharge mechanism 60 includes a pressure-regulating shut valve motor 68. The pressure-regulating shut valve motor 68 generates a torque to regulate the valve opening of the pressure-regulating shut valve 67.

The air passing through the pressure-regulating shut valve 67 passes through the connection point with the bypass 69 and is released through the open air port to the atmosphere.

The cooling water circulation mechanism 70 provided to cool down the fuel cell stack 40 includes a radiator 71 and a cooling water circulation pump 72. The cooling water circulation mechanism 70 circulates cooling water between the unit cells 41 and the radiator 71 to control the operation temperature of the unit cells 41. Circulation of cooling water in this manner implements absorption of heat in the unit cells 41 and release of heat in the radiator.

The power supply mechanism 80 supplies electric power to electrically-powered equipment. The electrically-powered equipment includes, for example, a motor 91 for driving drive wheels 92 and a compressor for air conditioning (not shown).

The control unit 100 is an ECU (Electronic Control Unit) including a CPU, a RAM and a ROM. The control unit 100 controls the other components of the fuel cell vehicle 20 in response to a power generation request. More specifically, the control unit 100 outputs control signals to, for example, the fuel cell system 30 and the power supply mechanism 80.

When there is no need for power generation, the control unit 100 stops power generation by the fuel cell system 30. The case that there is no need for power generation is, for example, the case that the fuel cell vehicle 20 is parked. The control unit 100 outputs control signals to stop the operation of the air compressor 62 and close the flow-dividing shut valve 63 and the pressure-regulating shut valve 67, in order to stop power generation. In the description hereof, "closing the flow-dividing shut valve 63" blocks the flow path between upstream and downstream of the air supply path 61 and opens flow path between the bypass 69 and upstream of the air supply path 61. As a result, the air in the fuel cell stack 40 is cut off from the atmosphere during stop of power generation.

2. Control at Start of Fuel Cell System 30 (FIG. 2)

When receiving a request for power generation during stop of power generation, the control unit 100 performs control to start power generation by the fuel cell system 30. Control signals output to the air supply discharge mechanism 60 for the purpose of such control serve to control the air compressor 62, the flow-dividing shut valve motor 64 and the pressure-regulating shut valve 67. The control unit 100 utilizes the measurement result of the pressure gauge 65 and the time measurement of a timer (not shown) for this control. This timer is incorporated in the control unit 100. As described above, the measurement result of the pressure gauge 65 is stack inner pressure. The following describes the details of the control.

Figure 2:
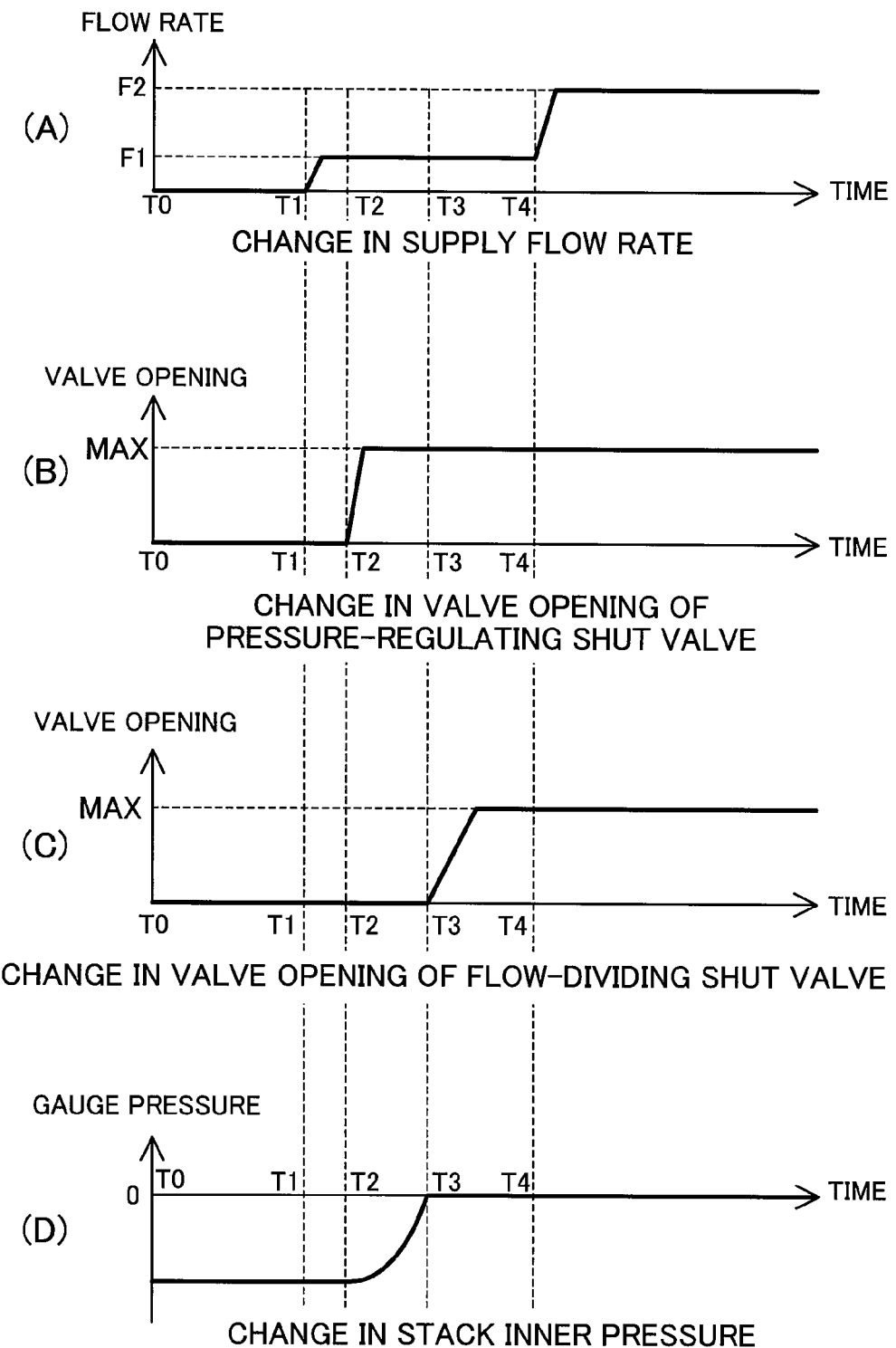
FIG. 2 is graphs showing time-dependent changes of a plurality of parameters at a start of a fuel cell system 30.

FIG. 2 shows time-dependent changes of a plurality of parameters at a start of the fuel cell system 30. FIG. 2A shows an exemplary time-dependent change in flow rate of the compressed air supplied by the air compressor 62 (hereinafter referred to as "supply flow rate"). FIG. 2B shows an exemplary time-dependent change in valve opening of the pressure-regulating shut valve 67. FIG. 2C shows an exemplary time-dependent change in valve opening of the flow-dividing shut valve 63. FIG. 2D shows an exemplary time-dependent change in stack inner pressure. The valve opening of the flow-dividing shut valve 63 herein means the opening position of the flow path from upstream to downstream of the air supply path 61.

A time period between a time T0 and a time T1 is a time period when power generation by the fuel cell system 30 stops. During the time period when power generation stops, the supply flow rate is maintained at zero as shown in FIG. 2A, while the valve openings of the pressure-regulating shut valve 67 and the flow-dividing shut valve 63 are kept at zero position as shown in FIGS. 2B and 2C.

During stop of power generation, the stack inner pressure may be lower than the atmospheric pressure in some cases as described above. FIG. 2D shows such a state. The ordinate of FIG. 2D shows the gauge pressure, and the value of zero at the ordinate indicates that the stack inner pressure is equal to the atmospheric pressure. As shown in FIG. 2D, the stack inner pressure is negative pressure during the time period between the time T0 and the time T1.

At the time T1, the control unit 100 starts the control for starting the fuel cell system 30, in order to start power generation. As shown in FIG. 2A, the supply flow rate starts increasing at the time T1. More specifically, the air compressor 62 starts supply of the compressed air in response to a control signal from the control unit 100. The air compressor 62 subsequently increases its rotation speed to make the supply flow rate reach a specific flow rate F1, in response to a control signal from the control unit 100.

As shown in FIG. 2, the pressure-regulating shut valve 67 and the flow-dividing shut valve 63 are closed at the time T1. The supplied compressed air accordingly flows from the flow-dividing shut valve 63 into the bypass 69, flows through the air discharge path 66 and is released to the atmosphere. The purpose of this air supply is to expel any foreign substances remaining in the air supply discharge mechanism 60 to the atmosphere. The foreign substances include, for example, ice, dust and gravel.

As shown in FIG. 2B, at a time T2, the pressure-regulating shut valve motor 68 starts increasing the valve opening of the pressure-regulating shut valve 67, in response to a control signal from the control unit 100. The time T2 is a time when a predetermined time period has elapsed since the time T1. The predetermined time period is specified in advance as a sufficient time period for expelling the foreign substances described above. The control unit 100 uses the timer to determine whether the current time reaches the time T2.

The pressure-regulating shut valve motor 68 subsequently maximizes the valve opening of the pressure-regulating shut valve 67, in response to a control signal from the control unit 100. This enables the air to be flowed from the open air port of the air supply path 61 through the bypass 69 into the fuel cell stack 40. The compressed air by the air compressor 62 accordingly flows into the fuel cell stack 40. This air inflow increases the stack inner pressure as shown in FIG. 2D.

According to this embodiment, the air compressor 62 keeps the flow velocity of the compressed air supplied by itself (hereinafter referred to as "supply flow velocity") at a level equal to or greater than a specified value, in response to a control signal from the control unit 100. This specified value is a value determined to prevent or suppress the air flowed from the open air port of the air discharge path 66 from flowing back into the fuel cell stack 40. In other words, the supply flow velocity is kept at a value higher than the flow velocity of the air taken in through the air discharge path 66 into the fuel cell stack 40. In addition to this condition, the supply flow velocity is kept at such a value that makes the noise and others produced by the operation of the air compressor 62 equal to or less than a reference value.

As shown in FIG. 2D, the stack inner pressure reaches the atmospheric pressure after the time T2. A time T3 means the time when the control unit 100 detects that the stack inner pressure reaches the atmospheric pressure by using the measurement result of the pressure gauge 65. At the time T3, the flow-dividing shut valve motor 64 starts opening the flow-dividing shut valve 63, in response to a control signal from the control unit 100. This causes the air to be supplied through the air supply path 61 to the fuel cell stack 40.

At a time T4, The air compressor 62 starts increasing the supply flow rate, in response to a control signal from the control unit 100. The time T4 is a time when a predetermined time period has elapsed since the time T3. This predetermined time period is specified in advance as a sufficient time period for making the valve opening of the flow-dividing shut valve 63 reach the maximum. The control unit 100 uses the time to determine whether the current time reaches the time T4.

After the time T4, the air compressor 62 increases the supply flow rate to a flow rate F2, in response to a control signal from the control unit 100. The flow rate F2 is a supply flow rate required for power generation and is a target value at least at the start time of the fuel cell system 30.

3. Advantageous Effects Achieved by Fuel Cell System 30

In the fuel cell system 30 described above, only a small torque is required to be generated by the flow-dividing shut valve motor 64. This is because the flow-dividing shut valve motor 64 starts opening the flow-dividing shut valve 63 when the stack inner pressure reaches the atmospheric pressure. In other words, the flow-dividing shut valve motor 64 starts opening the flow-dividing shut valve 63 when the pressure difference between upstream and downstream of the flow-dividing shut valve 63 becomes sufficiently small. This reduces the required torque for the flow-dividing shut valve motor 64 and thus allows for manufacturing cost reduction and downsizing.

As described above, the fuel cell system 30 supplies the air through the air discharge path 66 to the fuel cell stack 40, in order to increase the stack inner pressure to the atmospheric pressure before starting opening the flow-dividing shut valve 63. By this air supply, the fuel cell system 30 reduces foreign substances flowing into the fuel cell stack 40. The possibly-inflowing foreign substances include those remaining in part of the air supply discharge mechanism 60 and those flowing in from the open air port of the air discharge path 66. The part of the air supply discharge mechanism 60 includes part of the air supply path 61, part of the air discharge path 66 and the bypass 69. The part of the air supply path 61 and the part of the air discharge path 66 are locations closer to the respective open air ports than the connection points by the bypass.

Inflow of foreign substances remaining in the part of the air supply discharge mechanism 60 is reduced by expelling the remaining foreign substances before supplying the air to the fuel cell stack 40. Foreign substances flowing in from the open air port of the air discharge path 66 is reduced by adjusting the flow velocity of the air supplied by the air compressor 62 to prevent the air from flowing in from the open air port of the air discharge path 66.

Step-by-step increase of the supply flow rate, i.e., from the flow rate of zero to the flow rate F1 and from the flow rate F1 to the flow rate F2, reduces the noise and others produced by an abrupt increase in supply flow rate. Additionally, the supply flow rate is maintained at the flow rate F1 for the time period between the time T2 and the time T4. This reduces the power consumption by the air compressor 62, compared with a procedure of maintaining the supply flow rate at the flow rate F2 for the time period between the time T2 and the time T4.

4. Modifications

The invention is not limited to the above embodiment but may be embodied in various other aspects within the scope of the invention. For example, additional components among the components of the embodiment may be omitted from the embodiment. The additional components herein mean elements corresponding to the matters not specified in main claims. The following describes some of possible modifications.

Figure 3:
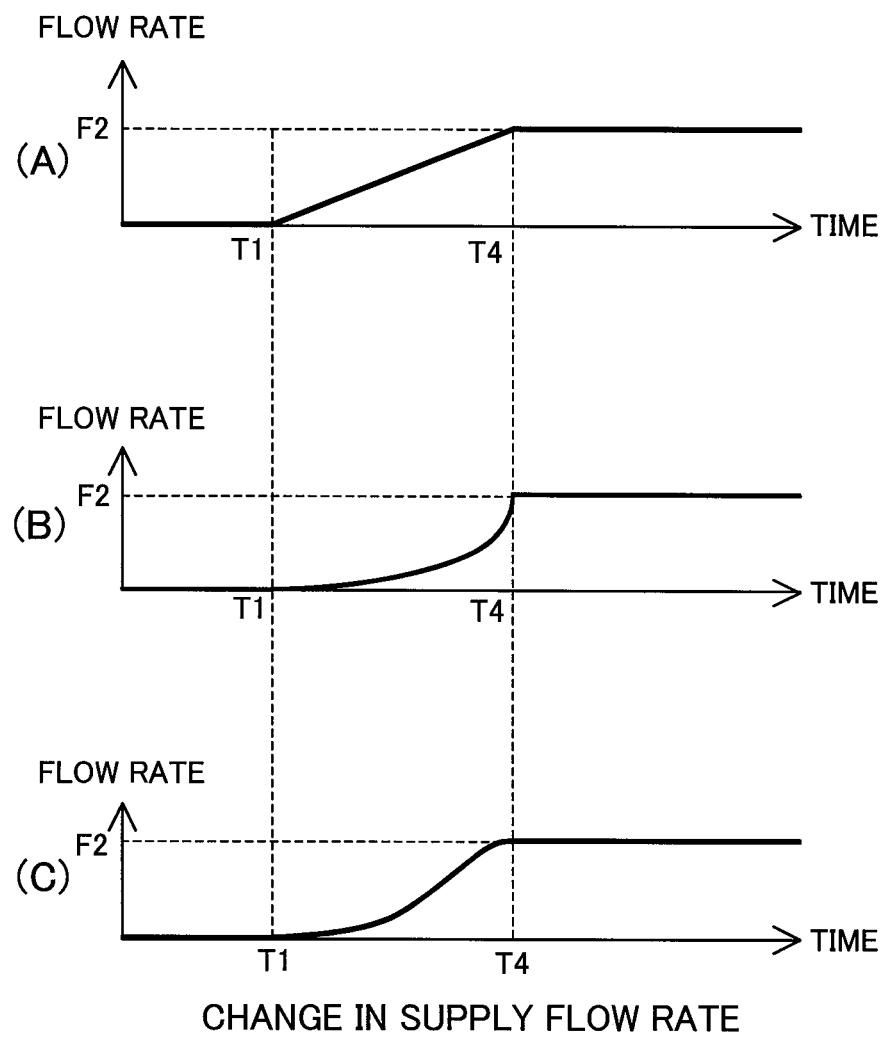
FIG. 3 is graphs showing time-dependent changes in flow rate of the supplied air at a start of the fuel cell system 30.

4-1. Method of Increasing Supply Flow Rate (FIG. 3)

The method of increasing the supply flow rate from zero to F2 at the start time may be replaced by any of the methods described below. FIG. 3 shows three graphs illustrating time-dependent changes in supply flow rate at the start time. FIGS. 3A, 3B and 3C show different patterns.

FIG. 3A shows a linearly increasing method. FIG. 3B shows an increasing method with gradually increasing the rate of increase. FIG. 3C shows an increasing method with at first gradually increasing the rate of increase and after that gradually decreasing the rate of increase. Herein "after that" means after a specific time when approximately half the time period between the time T1 and the time T4 has elapsed. The time T4 herein is a time when a predetermined time period has elapsed since the time T1. This predetermined time is specified in advance as a sufficient time period for making the valve opening of the flow-dividing shut valve 63 reach the maximum by the series of controls described above with reference to FIG. 2. The control unit 100 uses the timer to determine whether the current time reaches the specific time when approximately half the time period has elapsed and whether the current time reaches the time T4. The specific time when approximately half the time period has elapsed may be replaced by another specific time when approximately one third the time period has elapsed.

Any of the methods shown in FIGS. 3A, 3B and 3C gradually increases the supply flow rate, thus reducing the noise and others produced by an abrupt change of the supply flow rate.

The method shown in FIG. 3B smoothly changes the supply flow rate especially around the time T1, thus reducing the noise and others. The method shown in FIG. 3C, on the other hand, smoothly changes the supply flow rate especially around the time T1 and around the time T4, thus reducing the noise and others.

The method of increasing the supply flow rate is not limited to the methods described above. It is, however, contemplated that any other method of increasing the supply flow rate by monotonic increase like the above methods is preferable, in order to reduce the noise and others. The monotonic increase means either an increase in supply flow rate or no change of supply flow rate over time. It would be appreciated that the increasing method may be other than monotonic increase.

4-2. Other Modifications (a) A flow rate for exposing the fuel cell stack 40 to the atmosphere may be provided separately from the air supply path 61 and the air discharge path 66.

(b) The bypass 69 may be omitted. In this application, in order to increase the stack inner pressure, the pressure-regulating shut valve may be opened to expose the fuel cell stack 40 to the atmosphere. This reduces the pressure difference between upstream and downstream of the flow-dividing shut valve 63 by the simple method.

(c) The flow-dividing shut valve motor 64 may start opening the flow-dividing shut valve 63 before the stack inner pressure reaches the atmospheric pressure, for example, when the stack inner pressure reaches 90% of the atmospheric pressure. This enables power generation to be started more quickly.

(d) The flow-dividing shut valve 63 may be replaced with two shut valves. This enhances the flexibility of design.

(e) The pressure gauge 65 may be omitted. In this application, the time T3 may be specified as a time after a predetermined time period from the time T2. This predetermined time period may be a sufficient time period for making the stack inner pressure reach the atmospheric pressure. This eliminates the need for measurement of the stack inner pressure and control based on the measurement result.

(f) During stop of the fuel cell system 30, when the stack inner pressure is equal to or higher than a predetermined value, the process described above with reference to FIG. 2 may be omitted. This predetermined value should be a sufficiently value (for example, atmospheric pressure or 90% of atmospheric pressure) that enables the flow-dividing shut valve motor 64 to open the flow-dividing shut valve 63. When the above process is omitted, for example, opening the flow-dividing shut valve 63 and the pressure-regulating shut valve 67 may be performed substantially at the same time with starting the operation of the air compressor 62. This enables power generation to be started more quickly when the stack inner pressure is equal to or higher than the predetermined value.

(g) The pressure-regulating shut valve 67 may not have the mechanism of cancelling the pressure difference. Available valves include, for example, a type of a valve that is hardly affected by the pressure difference in the valve opening operation and a type of a valve that is readily openable when the stack inner pressure is higher than the atmospheric pressure. This simplifies the structure of the pressure-regulating shut valve 67 and achieves cost reduction.

(h) The fuel cell system 30 may be not for automobiles, but may be for other transportation equipment or for domestic power supply. The transportation equipment includes two-wheel vehicles, three-wheeled vehicles, single passenger vehicles and trains.

(i) The type of fuel cell is not limited to the polymer electrolyte fuel cell but may be another type of fuel cell, such as molten carbonate fuel cell.

(j) The fuel gas is not limited to hydrogen but may be carbon monoxide according to the type of the fuel cell.

(k) An exclusive mechanism may be provided to increase the stack inner pressure. For example, the exclusive mechanism may store the air compressed by the air compressor 62 and supply the stored air to the fuel cell stack 40 at the start time of the fuel cell system 30.

(l) The supply flow rate may be controlled by regulate the valve opening of the pressure-regulating shut valve 67.

The invention claimed is:

1. A fuel cell system, comprising:
a fuel cell stack;
an air supplier discharger that supplies the air that is taken in from the atmosphere and compressed to the fuel cell stack through an air supply path and discharges the air from the fuel cell stack through an air discharge path during operation of the fuel cell stack;
a control unit including a CPU, a ROM, a RAM, a valve controller programmed to open a supply shut valve provided in the air supply path at a start of the fuel cell system, and a pressure regulator programmed to reduce a pressure difference between upstream and downstream of the supply shut valve, before the valve controller opens the supply shut valve; and
a bypass that serves as a flow path causing the air to flow from the air supply path to the air discharge path without passing through the fuel cell stack in at least a closed state of the supply shut valve, wherein
the pressure regulator has a pressure-regulating shut valve provided in the air discharge path to regulate the air pressure in the fuel cell stack during operation of the fuel cell system,
the pressure-regulating shut valve is provided between the fuel cell stack and a connection point of the air discharge path and the bypass, and
wherein in response to a control signal from the control unit, the pressure regulator programmed to open the pressure-regulating shut valve with a pressure-regulating shut valve motor to reduce the pressure difference between upstream and downstream of the supply shut valve at a start of the fuel cell system after the air supplier discharger starts compression of the air.

2. The fuel cell system according to claim 1, wherein
the pressure regulator makes an air pressure in the fuel cell stack approach to atmospheric pressure, in order to reduce the pressure difference between upstream and downstream of the supply shut valve.

3. The fuel cell system according to claim 1, wherein
the pressure-regulating shut valve has a mechanism of reducing a pressure difference between upstream and downstream of the pressure-regulating shut valve in a closed state of the pressure-regulating shut valve.

4. The fuel cell system according to claim 1, wherein
the valve controller opens the supply shut valve after the air pressure in the fuel cell stack reaches atmospheric pressure.

5. The fuel cell system according to claim 1, wherein
the supply shut valve is a flow-dividing valve provided at a connection point of the air supply path and the bypass.

6. The fuel cell system according to claim 1, wherein
the air supplier discharger supplies the air at such a flow velocity that prevents the air flowing in through an open air port of the air discharge path from flowing into the fuel cell stack after the pressure-regulating shut valve is opened.

7. The fuel cell system according to claim 1, wherein
the air supplier discharger maintains a supply flow rate that is a flow rate of the supplied air at a target value after the supply shut valve is opened, while setting the supply flow rate to a smaller value than the target value before the supply shut valve is opened.

8. The fuel cell system according to claim 7, wherein
the air supplier discharger maintains the supply flow rate at a constant value smaller than the target value after the pressure-regulating shut valve is opened but before the supply shut valve is opened.

9. The fuel cell system according to claim 7, wherein
the air supplier discharger linearly increases the supply flow rate, in order to make the supply flow rate reach the target value.

10. The fuel cell system according to claim 7, wherein
the air supplier discharger increases the supply flow rate with increasing a change rate of the supply flow rate, in order to make the supply flow rate reach the target value.

11. The fuel cell system according to claim 7, wherein
the air supplier discharger increases the supply flow rate with at first increasing a change rate of the supply flow rate and subsequently decreasing the change rate of the supply flow rate, in order to make the supply flow rate reach the target value.

12. A start method of a fuel cell system, comprising:
a fuel cell stack;
an air supplier discharger that supplies the air that is taken in from the atmosphere and compressed to the fuel cell stack through an air supply path and discharges the air from the fuel cell stack through an air discharge path during operation;
a supply shut valve provided in the air supply path;
a bypass that serves as a flow path causing the air to flow from the air supply path to the air discharge path without passing through the fuel cell stack in at least a closed state of the supply shut valve; and
a pressure-regulating shut valve provided between the fuel cell stack and a connection point of the air discharge path and the bypass, the method
opening the pressure-regulating shut valve to reduce the pressure difference between upstream and downstream of the supply shut valve at a start of the fuel cell system after the air supplier discharger starts compression of the air.

13. A start method of a fuel cell system according to claim 12, wherein
the pressure regulator makes an air pressure in the fuel cell stack approach to atmospheric pressure, in order to reduce the pressure difference between upstream and downstream of the supply shut valve.

14. A start method of a fuel cell system according to claim 12, wherein
the pressure-regulating shut valve has a mechanism of reducing a pressure difference between upstream and downstream of the pressure-regulating shut valve in a closed state of the pressure-regulating shut valve.

15. A start method of a fuel cell system according to claim 12, wherein
the valve controller opens the supply shut valve after the air pressure in the fuel cell stack reaches atmospheric pressure.

16. A start method of a fuel cell system according to claim 12, wherein
the supply shut valve is a flow-dividing valve provided at a connection point of the air supply path and the bypass.

17. A start method of a fuel cell system according to claim 12, wherein
the air supplier discharger supplies the air at such a flow velocity that prevents the air flowing in through an open air port of the air discharge path from flowing into the fuel cell stack after the pressure-regulating shut valve is opened.

18. A start method of a fuel cell system according to claim 12, wherein
the air supplier discharger maintains a supply flow rate that is a flow rate of the supplied air at a target value after the supply shut valve is opened, while setting the supply flow rate to a smaller value than the target value before the supply shut valve is opened.

19. A start method of a fuel cell system according to claim 18, wherein
the air supplier discharger maintains the supply flow rate at a constant value smaller than the target value after the pressure-regulating shut valve is opened but before the supply shut valve is opened.

20. A start method of a fuel cell system according to claim 18, wherein
the air supplier discharger linearly increases the supply flow rate, in order to make the supply flow rate reach the target value.

\* \* \* \* \*